Dec. 25, 1951  A. SCHWARZ  2,580,324
CAMERA DIAPHRAGM MECHANISM
Original Filed April 28, 1945  5 Sheets-Sheet 1
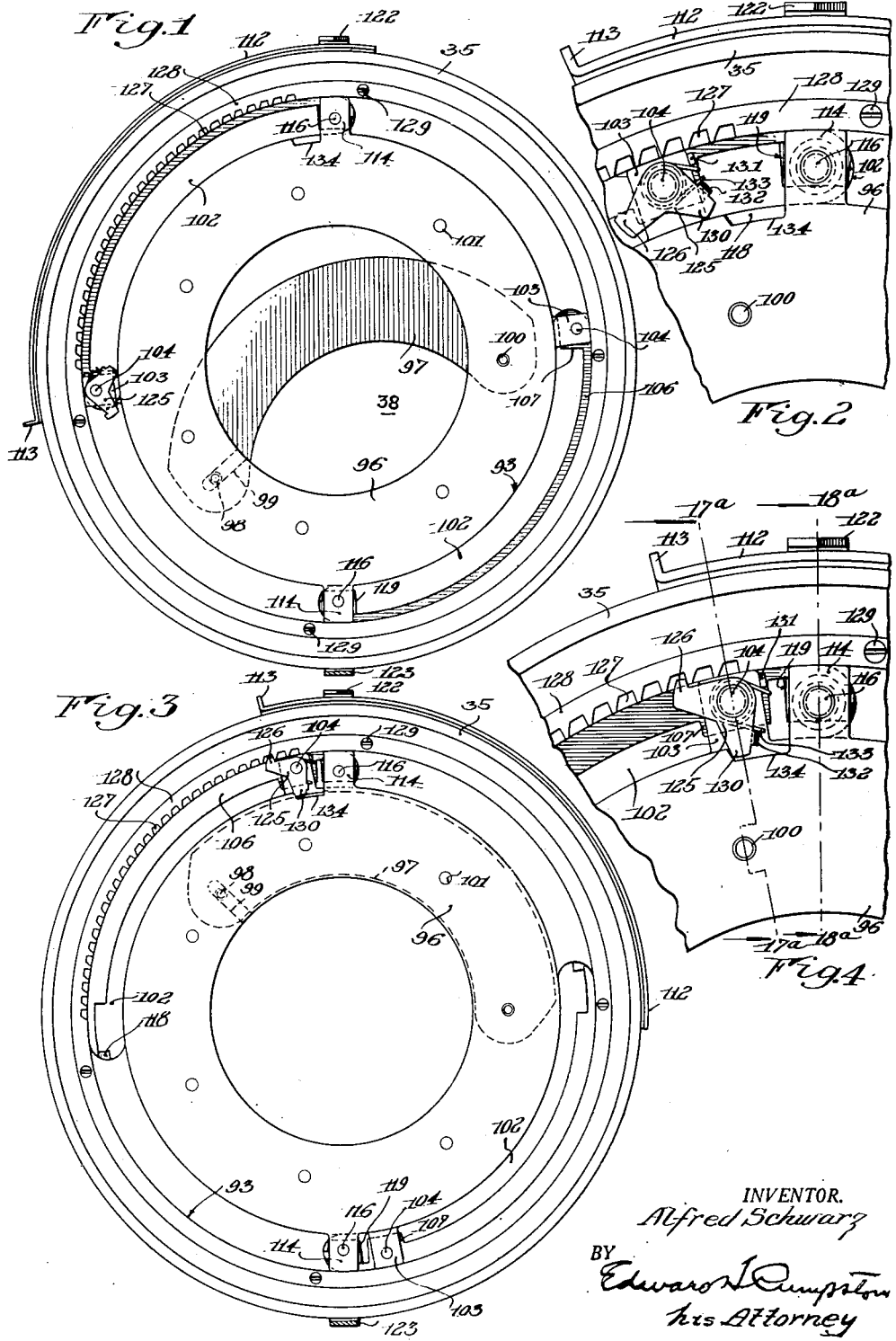
INVENTOR.
Alfred Schwarz
BY Edward L. Cumpston
his Attorney Dec. 25, 1951 — A. SCHWARZ — 2,580,324
CAMERA DIAPHRAGM MECHANISM
Original Filed April 28, 1945 — 5 Sheets-Sheet 2
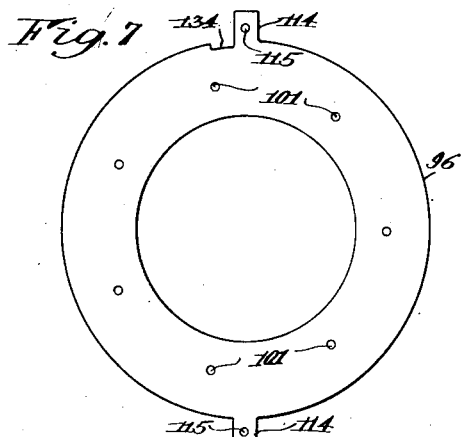
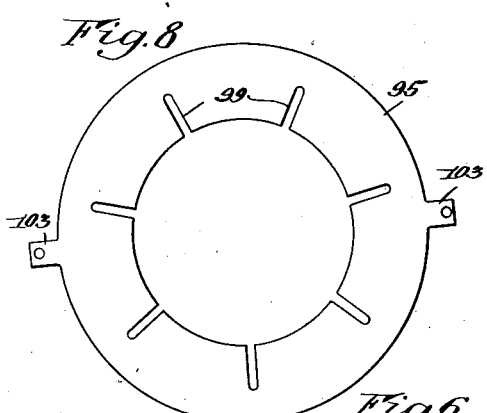
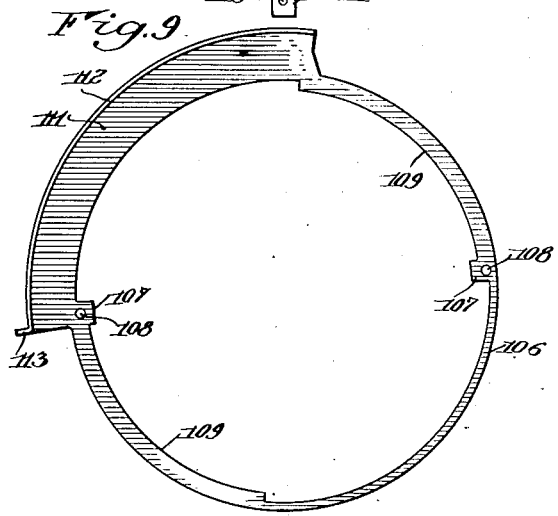
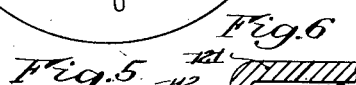
INVENTOR.
Alfred Schwarz
BY Edward H. Cumpston
his Attorney

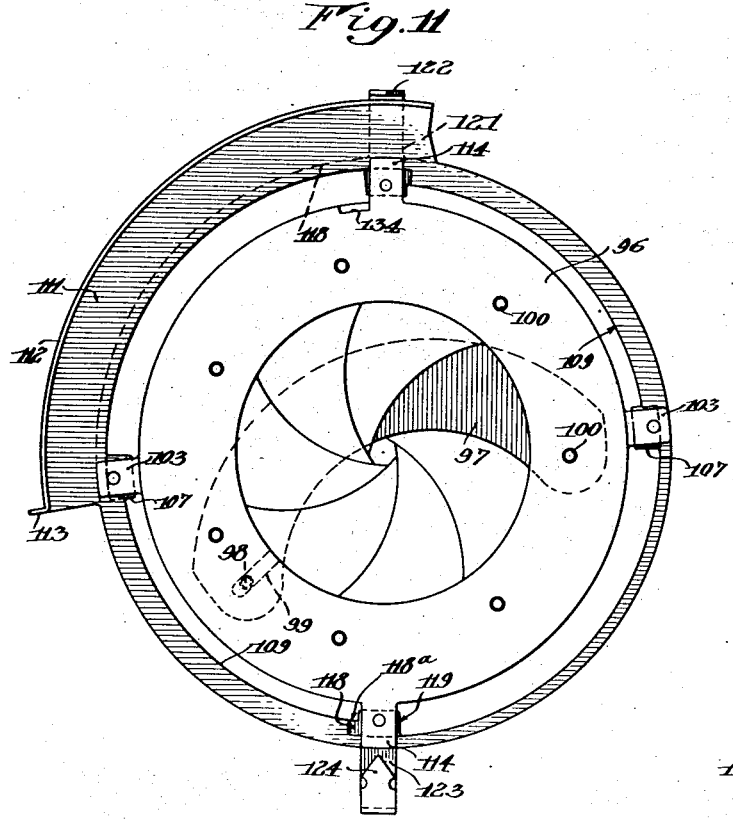

Dec. 25, 1951  A. SCHWARZ  2,580,324
CAMERA DIAPHRAGM MECHANISM
Original Filed April 28, 1945  5 Sheets-Sheet 4
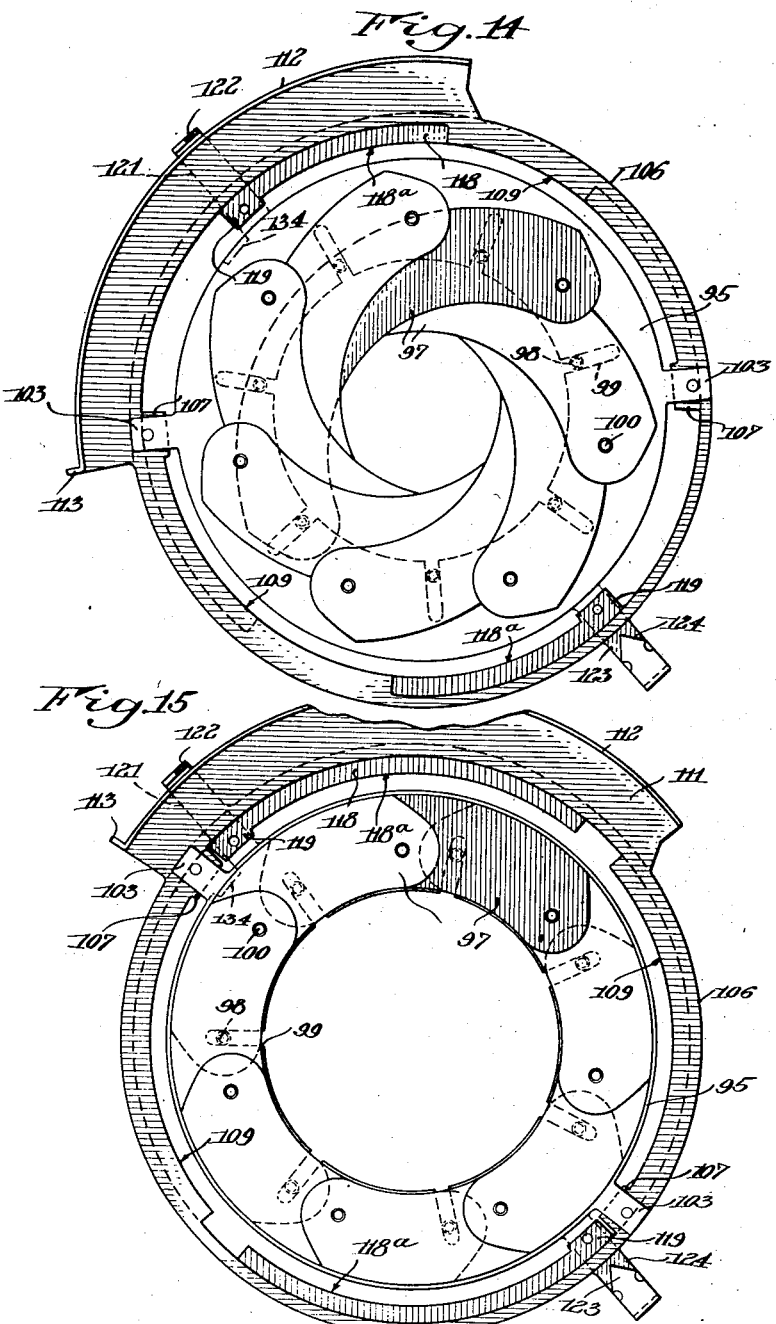
INVENTOR.
Alfred Schwarz
BY
Edward H Cumpston
his Attorney Dec. 25, 1951      A. SCHWARZ      2,580,324
CAMERA DIAPHRAGM MECHANISM
Original Filed April 28, 1945      5 Sheets-Sheet 5
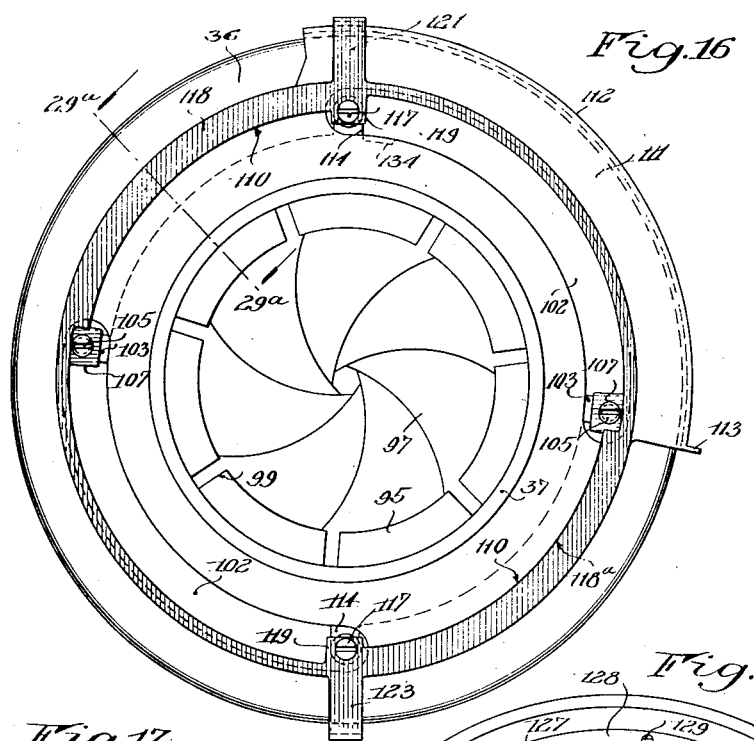
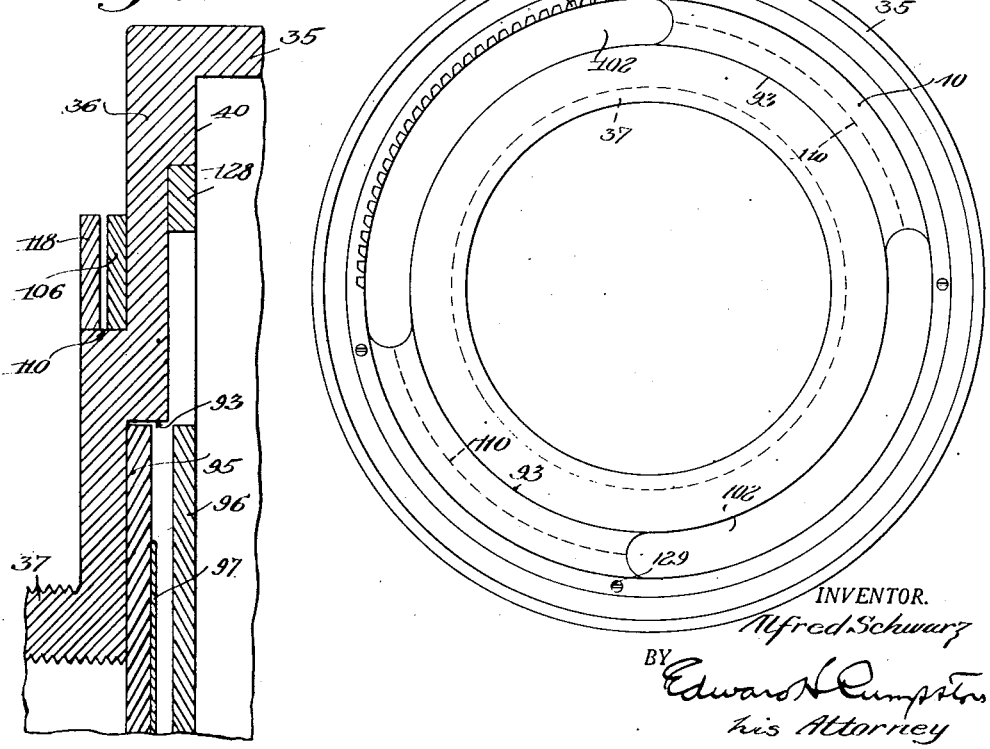
INVENTOR.
Alfred Schwarz
BY Edward H. Cumpston
his Attorney Patented Dec. 25, 1951

2,580,324

UNITED STATES PATENT OFFICE 2,580,324

CAMERA DIAPHRAGM MECHANISM

Alfred Schwarz, Rochester, N. Y., assignor to Ilex Optical Company, Rochester, N. Y., a corporation of New York Original application April 28, 1945, Serial No. 590,770. Divided and this application April 15, 1946, Serial No. 662,344

7 Claims. (Cl. 95—64)

This invention relates to camera diaphragm mechanism and more particularly to means for opening and closing the diaphragm to permit focusing adjustment of the camera. The ordinary camera may be prepared for focusing by setting the shutter for "Time" operation and opening the diaphragm by means movable for adjusting the diaphragm aperture, which, however, has involved a multiplicity of manipulations and resetting adjustments, some of which are apt to be forgotten with resulting failure in exposure. It has been proposed to partially remedy these difficulties by providing spring means for operating the diaphragm, so connected with the shutter mechanism as to automatically reset the diaphragm on resetting the shutter after focusing. But such constructions have continued to require a number of operations, some of which may be forgotten, and which are difficult to accomplish with the fingers of one hand while steadying the camera with the other.

Full opening of the diaphragm is very desirable because of the difficulty of focusing a dark image on the ground glass. The movement of conventional diaphragm has a considerable amplitude, in order to provide for such full opening, as well as for adjustment to a small aperture. Where such focusing movement is spring actuated, the amplitude of movement requires a spring of considerable strength which involves, in turn, the provision of considerable space for its movements in the shutter casing where space is strictly limited by the requirements of other parts of the mechanism.

One object of the invention, therefore, is to provide an improved diaphragm of a more simple and convenient construction and mode of operation, as well as one requiring a minimum of space in the shutter casing.

Another object is to provide such a diaphragm mechanism capable of being set to a predetermined aperture and thereafter fully opened to permit focusing and closed again to said aperture without requiring the resetting of the aperture by the photographer.

Another object is to provide such a diaphragm adapted for manual adjustment and requiring no actuating spring.

To these and other ends the invention resides in certain improvements and combinations of parts, all as will be hereinafter more fully described, the novel features being pointed out in the claims at the end of the specification.

In the drawings:

Fig. 1 is a front elevation of a diaphragm mechanism embodying the present invention and shown in closed position;

Fig. 2 is an enlarged detail of parts shown in Fig. 1, but with the parts in course of movement to open the diaphragm;

Fig. 3 is a view similar to Fig. 1, but showing the diaphragm in open position;

Fig. 4 is an enlargement of parts shown in Fig. 3 and in the same position;

Fig. 5 is an enlarged, sectional elevation on the line 17a—17a in Fig. 4;

Fig. 6 is an enlarged, sectional elevation on the line 18a—18a in Fig. 4;

Fig. 7 is an elevation of plate means for adjusting the diaphragm aperture;

Fig. 8 is an elevation of plate means for fully opening the diaphragm to permit focusing;

Fig. 9 is an elevation of ring means forming part of the mechanism for opening the diaphragm to permit focusing.

Fig. 10 is an elevation of ring means forming part of the mechanism for adjusting the diaphragm aperture;

Fig. 11 is a front elevation of some of the diaphragm parts detached from the casing;

Fig. 12 is an elevation of the parts as seen from the right in Fig. 11;

Fig. 13 is a front elevation of the diaphragm leaves associated with the plate shown in Fig. 8;

Fig. 14 is a view similar to Fig. 11, but showing the diaphragm leaves adjusted or closed to a desired exposure aperture;

Fig. 15 is a similar view, but showing the diaphragm open to permit focusing;

Fig. 16 is a rear elevation of the diaphragm mechanism;

Fig. 17 is an enlarged section on the line 29a—29a in Fig. 16, and

Fig. 18 is a front elevation of the provisions for the diaphragm mechanism on the casing rear wall.

The invention is embodied in the present instance in association with camera shutter mechanism of the between-the-lens type comprising a motor or master member adapted to be set to position to tension spring actuating means for opening and closing the shutter blades on release by a release member or trigger, as described in my Patent No. 2,480,973, issued September 6, 1949, Shutter and Diaphragm Mechanism for Cameras, of which the present application is a division.

Referring more particularly to the drawings, the present embodiment preferably comprises a casing having the usual cylindrical wall 35 (Fig.

5) and a rear partition wall 36 with the usual flange 37 for supporting rear lens means (not shown) over an exposure opening 38. The diaphragm mechanism is located on the rear wall 36, for which purpose this wall is formed with a circular recess 93 and a rear wall surface 94 (Fig. 5). Mounted for oscillation in the recess against its rear wall 94 is an annular plate 95 forming part of the means for opening the diaphragm for focusing and hereafter referred to as an actuating means or plate. Oscillating in recess 94 and spaced in front of focusing plate 95, is an annular plate 96 forming part of the means for adjusting the diaphragm to a desired focusing aperture and hereafter also referred to as an actuating means or plate. Plates 95 and 96 are retained in position by the cylindrical wall of the recess and each plate is pivotally connected with a plurality of elongated diaphragm leaves 97 located in the space between the plates. Each of the leaves is formed at one end with a flanged trunnion or pivot 98 for pivotal engagement in one of a plurality of radial slots 99 formed in the actuating plate 95. Each of the leaves is provided at its other end with a similar flanged pivot 100 which is pivotally engaged in one of a plurality of openings 101 in actuating plate 96, so that either of the plates 95 or 96 may be oscillated to open or close the diaphragm with the leaves pivoting on the other plate.

The rear wall 36 of the casing is formed diametrically with arcuate slots 102 (Fig. 18) and actuating plate 95 has peripheral lugs 103 extending radially in the slots 102 (Figs. 1 and 5). Each of these lugs carries a short stud 104 on which is mounted and retained, as by means of a screw 105, a ring 106 hereafter referred to as an actuating member or ring. This ring has inwardly extending lugs 107 formed with openings 108 for attachment to the studs 104 in slots 102, respectively, and diametrically opposite inner peripheral portions 109 of the ring have oscillating bearings on a circular rear shoulder 110 of the casing wall 36 (Fig. 17), for oscillation with the actuating plate 95. Ring 106 has a quadrant extension 111 (Figs. 5 and 9) formed at its periphery with a flange 112 extending forwardly over the cylindrical wall 35 of the casing, for cooperation with parts of the shutter mechanism as described in my said patent. One end of the flange 112 is turned upwardly as at 113, to serve as a finger piece for oscillating the actuating ring and thereby oscillating the actuating plate 95 for opening and closing the diaphragm blades.

Actuating plate 96 is similarly formed with peripheral lugs 114 (Fig. 7) extending radially in the slots 102 (Figs. 1 and 6), respectively, each lug being formed with an opening 115 in which is mounted a stud 116 carrying a screw 117. Mounted on screws 117 is a ring 118, hereafter referred to as an actuating member or ring, which has inwardly extending lugs 119 formed with openings 120 for receiving the screws 117. Ring 118 has opposite, arcuate, inner peripheral portions 118a, which support it for oscillation on the casing shoulder 110, and has a radially projecting arm 121, the outer end of which is turned forwardly over the cylindrical wall 35 of the casing and pointed, as at 122, to serve as an indicator. Ring 118 has also a diametrically opposite arm 123 extended forwardly across the cylindrical wall 35 of the casing with its end turned radially inwardly over the cover plate and pointed, as at 124, to serve as an indicator, the indicating pointers 122 and 124 being adapted for cooperation with indicating scales (not shown) marked on the casing as may be found convenient. The pointer arms 121 and 123 serve as operating means for oscillating ring 118 and its associated plate 96 for opening and closing the diaphragm leaves to obtain a desired exposure aperture.

It will be apparent from the above described construction that the actuating ring 118 may be rotated to some such position as shown in Figs. 14 and 15 for adjusting the leaves to a desired aperture, ring 106 being positioned by counterclockwise movement to its normal or inactive position. With the leaves thus adjusted to a desired exposure aperture, ring 106 may be rotated clockwise by means of its finger piece 113 to fully open the leaves to permit focusing, the finger piece 113 being thus moved adjacent the arm 121 of the ring 118, as shown in Fig. 15. After focusing adjustment of the camera, finger piece 113 may be moved counter-clockwise from the position shown in Fig. 15 to the position shown in Fig. 14, thereby restoring the diaphragm to the selected aperture previously obtained by adjusting arm 121.

The diaphragm may thus be fully opened to permit focusing, independently of the aperture setting, but means are preferably provided to limit the opening movement of the ring 106 to prevent it from engaging and moving the ring 118, such means preferably comprising a dog 125 (Figs. 2 and 5) pivotally mounted on the extended forward end of the stud 104 of actuating plate 95. The dog has a head portion 126 adapted for engagement in one of a series of notches 127 formed on the inner periphery of a ring 128 secured by screws 129 in a recess in the rear wall 36 of the casing about the diaphragm mechanism. The dog 125 has a tail 130 adapted for sliding engagement with the periphery of the actuating plate 96. A spring 131 coiled about the pivot of the dog bears at one end against a lug 132 on the tail of the dog and at the other end against an ear 133 on the adjacent lug 103 of the plate 95. The periphery of the actuating plate 96 is formed adjacent its stud 116 with a notch 134 into which the tail of the dog is adapted to drop under actuation by its spring, thereby raising the head portion 126 of the dog into engagement with one of the notches 127 of rack 128 and stopping and locking the plate 95 before contact of its lug 103 with the stud 116 of the plate 96. Such means thus prevents excessive movement of the actuating plate 95 far enough to engage and disturb the setting of actuating plate 96 to whatever position it may have been adjusted.

It is evident from the above description that the invention provides a simple and practical diaphragm mechanism having an adjusting part accessibly and conveniently located on the exterior of the casing for setting the diaphragm to any desired aperture opening. This part is connected to one end of each of the diaphragm leaves and the mechanism comprises a second adjusting part, similarly positioned, and pivotally connected with the other end of each of the leaves for manually adjusting them to fully opened position to permit focusing, after which the diaphragm may be closed or, if preset to a desired aperture, restored to said aperture setting, without reference to scales or like indicating means. Such opening of the diaphragm preliminary to focusing is accomplished manually, so as to obviate the provision of a spring for moving the diaphragm leaves and so that the mechanism occupies a minimum of space within the casing.

Although such opening of the diaphragm to permit focusing is not spring actuated or tripped automatically by connection with the shutter mechanism, it may be adapted for interlocking association with the shutter mechanism, to prevent errors in operation, as described in my said patent.

It will thus be seen that the invention accomplishes its objects and while it has been herein disclosed by reference to the details of preferred embodiments, it is to be understood that such disclosure is intended in an illustrative, rather than a limiting sense, as it is contemplated that various modifications in the construction and arrangement of the parts will readily occur to those skilled in the art, within the spirit of the invention and the scope of the appended claims.

I claim:

1. A camera diaphragm mechanism comprising a casing having a diaphragm opening, a plurality of diaphragm leaves for controlling said opening, a plurality of independently movable elements each connected with all of said leaves for moving the same to vary said opening, said elements being movable along a common path into interfering engagement with each other and stop means comprising cooperating parts on said elements and casing for releasably connecting one of said elements with said casing to prevent engagement thereby with the other of said elements in the different adjusted positions of said other element.

2. A camera diaphragm mechanism comprising a casing having a diaphragm opening and a plurality of diaphragm leaves for controlling said opening, actuating means movably connected with each of said leaves adjacent one end thereof, a second actuating means movably connected with each of said leaves adjacent the other end thereof, said actuating means having a portion thereof movable in opposite directions in a path common to both for opening and closing said leaves, and stop means comprising a part movably mounted on one of said actuating means for operation by the other of said actuating means to engage said casing and thereby limit the movement of one of said actuating means relative to the other of said actuating means.

3. A camera diaphragm mechanism comprising a casing having a diaphragm opening and a plurality of diaphragm leaves for controlling said opening, an actuating member movably connected with each of said leaves adjacent one end thereof and movable manually in opposite directions to open and close said leaves, a second actuating member movably connected with each of said leaves adjacent the other end thereof and movable manually in opposite directions to open and close said leaves, said members having portions movable in a path common to both thereof, and stop means comprising cooperating parts on said members and casing operable in any adjusted position of one of said members for connecting the other of said members with said casing and stopping the movement of said other member to prevent said other member from engaging and deranging the position of the first mentioned member.

4. A camera diaphragm mechanism comprising a casing, a plurality of diaphragm leaves in said casing, an annular plate means movably connected with each of said leaves adjacent one end thereof, and movable to open and close said leaves to obtain a desired exposure aperture, a second annular plate means movably connected with each of said leaves adjacent the other end thereof and freely movable manually in opposite directions to open and close said leaves to permit focusing adjustment of said camera, said casing having an opening therein, operating and indicating means extending from each of said plate means through said opening and movable over the exterior of said casing, a series of notches on said casing, and a toothed dog pivoted on one of said plate means, the other of said plate means having a portion formed to control the pivotal movement of said dog for engaging the same with one of said notches in a predetermined relative position of said plate means.

5. A camera diaphragm mechanism comprising a casing having an opening through a wall thereof, a plurality of diaphragm leaves in said casing, an element movably connected with each of said leaves adjacent one end thereof and having an oscillating movement in said casing to adjust said leaves to a desired exposure aperture, a second element movably connected with each of said leaves adjacent the other end thereof and having an oscillating movement in said casing to open and close said leaves to permit focusing adjustment of said camera, a pair of ring members mounted for oscillation on the exterior of said casing and connected through said casing opening with said elements respectively, said rings being freely movable manually in opposite directions to open and close said leaves and having parts engageable with each other and stop means comprising relatively movable cooperating parts on said elements and casing operable by the relative movement of said elements for releasably connecting one of said elements with said casing to prevent said element from engaging and deranging the position of the other of said elements in the different adjusted positions of said other element.

6. A camera diaphragm mechanism comprising a casing having an opening in a wall thereof, a plurality of diaphragm leaves in said casing, an annular plate means movably connected with each of said leaves adjacent one end thereof and mounted for oscillation in said casing to adjust said leaves to a desired exposure opening, a second annular plate means movably connected with each of said leaves adjacent the other end thereof and mounted for oscillating movement in said casing to open and close said leaves to permit focusing adjustment of said camera, a dog pivotally mounted on said second plate means for engagement with the first mentioned plate means and for locking engagement with said casing, the first mentioned plate means having a portion formed to control said dog to lock said second plate means in predetermined relation with the first mentioned plate means, and manually operable actuating means for each of said plate means extending through said opening exteriorly of said casing.

7. A camera diaphragm mechanism comprising a casing having an opening in a wall thereof, a plurality of diaphragm leaves in said casing, an element movably connected with each of said leaves adjacent one end thereof and mounted for oscillation in said casing to adjust said leaves to a desired exposure aperture, a second element movably connected with each of said leaves adjacent the other end thereof and mounted for oscillation in said casing to open and close said leaves to permit focusing adjustment of said camera, a spring actuated dog pivoted on said second element for engagement with the first mentioned element and for locking engagement with said casing, the first mentioned element having a portion formed for controlling said dog to lock said second element in predetermined relation with said first mentioned element in different adjusted positions thereof, and a pair of rings mounted for oscillation on the exterior of said casing and connected through said opening therein with said elements, respectively.

ALFRED SCHWARZ.

REFERENCES CITED

The following references are of record in the file of this patent:

UNITED STATES PATENTS

| Number | Name | Date |
|---|---|---|
| 1,469,763 | Snyder et al. | Oct. 2, 1923 |
| 2,222,298 | Nerwin | Nov. 19, 1940 |
| 2,271,222 | Eagle | Jan. 27, 1942 |
| 2,322,034 | Lee | June 15, 1943 |
| 2,340,573 | Aiken | Feb. 1, 1944 |
| 2,341,387 | Riddell | Feb. 8, 1944 |